United States Patent [19]

Goto et al.

[11] Patent Number: 5,441,688
[45] Date of Patent: Aug. 15, 1995

[54] MANUFACTURING METHOD FOR FORMING AN ELONGATE BODY HAVING A THICKNESS CHANGE

[75] Inventors: Shinichi Goto; Chiaki Komiyama; Hiroshi Iwasaki; Kazukiyo Hayashi, all of Inazawa, Japan

[73] Assignee: Toyoda Gosei Co., Ltd., Nishikasugai, Japan

[21] Appl. No.: 119,686

[22] Filed: Sep. 13, 1993

[30] Foreign Application Priority Data

Oct. 30, 1992 [JP] Japan ................... 4-293314

[51] Int. Cl.$^6$ ............................................ B29C 47/22
[52] U.S. Cl. ................... 264/167; 156/107; 156/244.15; 156/244.25; 264/177.16; 264/209.2; 425/465
[58] Field of Search ............ 264/167, 177.10, 177.16, 264/177.17, 177.19, 177.20, 209.2-209.4; 425/466, 380, 465; 156/107-109, 244.25, 244.15

[56] References Cited

U.S. PATENT DOCUMENTS

| | | | |
|---|---|---|---|
| 3,152,202 | 10/1964 | Murphy, Jr. | 425/465 |
| 3,587,281 | 6/1971 | Lemelson | 425/465 |
| 4,110,394 | 8/1978 | Shimada et al. | 264/40.7 |
| 4,218,416 | 8/1980 | Gokcen | 425/465 |
| 4,279,857 | 7/1981 | Feuerherm | 425/466 |
| 4,422,839 | 12/1983 | Przytulla et al. | 264/167 |
| 4,425,289 | 1/1984 | Lee et al. | 264/40.7 |
| 4,619,077 | 10/1986 | Azzola et al. | |
| 4,968,543 | 11/1990 | Fujioka et al. | |
| 5,070,590 | 12/1991 | Fujioka et al. | |
| 5,110,529 | 5/1992 | Arima | 264/167 |
| 5,183,522 | 2/1993 | Arima | 264/209.3 |
| 5,240,664 | 8/1993 | Hayashi et al. | 264/167 |

FOREIGN PATENT DOCUMENTS

| | | | |
|---|---|---|---|
| 2805975 | 8/1978 | Germany | 264/167 |
| 51-5366 | 1/1976 | Japan | 264/167 |

*Primary Examiner*—Jeffery R. Thurlow
*Attorney, Agent, or Firm*—Cushman, Darby & Cushman

[57] ABSTRACT

A method is provided for forming an elongate body having thickness change, such as a car window molding. In the method, a vertical member is extruded into a fixed wall thickness and a fixed outline. A horizontal member is extruded into the same outline as that of the vertical member but has a smaller wall thickness than that of the vertical member. An apparatus is provided to perform the method. The apparatus has a slide core axially reciprocating in a bore of a die so as to change a shape of a forming space.

7 Claims, 8 Drawing Sheets

MANUFACTURING METHOD FOR FORMING AN ELONGATE BODY HAVING A THICKNESS CHANGE

The priority application, Japanese patent application No. 4-293314 filed Oct. 30, 1992, is hereby incorporated hereinto by reference.

BACKGROUND OF THE INVENTION

1. Field of the Invention

This invention relates to a manufacturing method for forming an elongate body having a thickness change, and in particular, to a manufacturing method for forming an elongate body used in a window molding for automobiles that has vertical members molded into a section different from that of a horizontal member.

2. Description of Related Art

Figure 6:
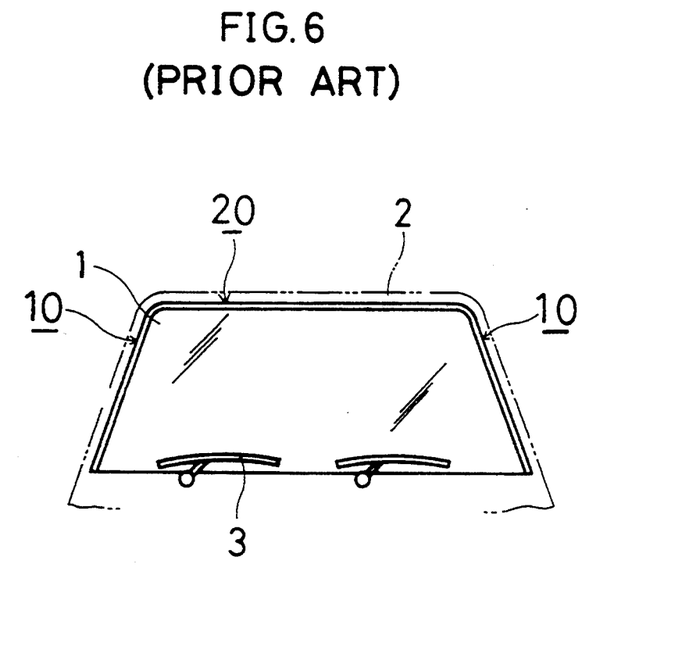
FIG. 6 is a front view of a conventional window molding for automobiles.
Figure 7:
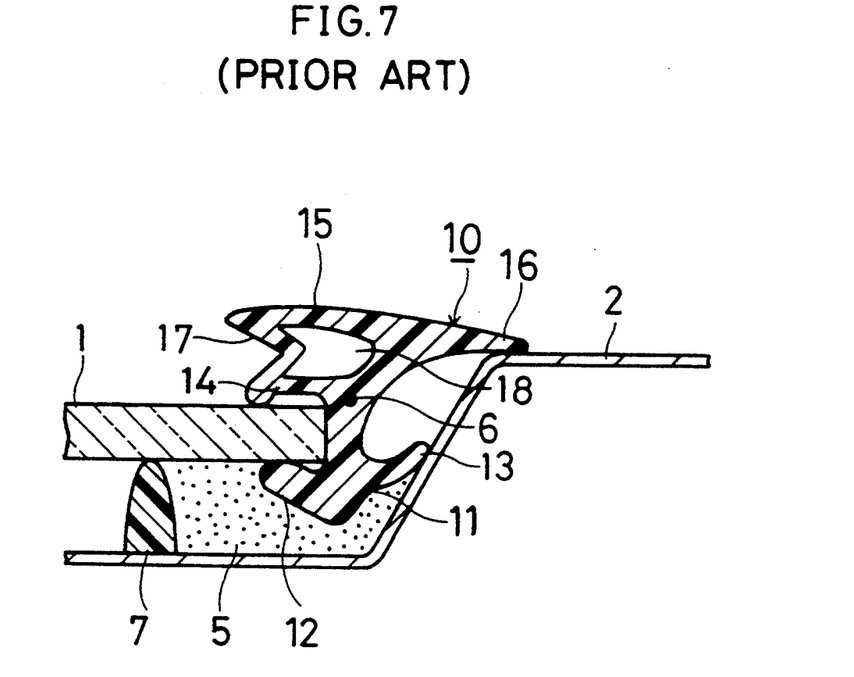
FIG. 7 is a cross-sectional view of a vertical member of a window molding for automobiles produced by a conventional manufacturing method for forming an elongate body having a thickness change.
Figure 8:
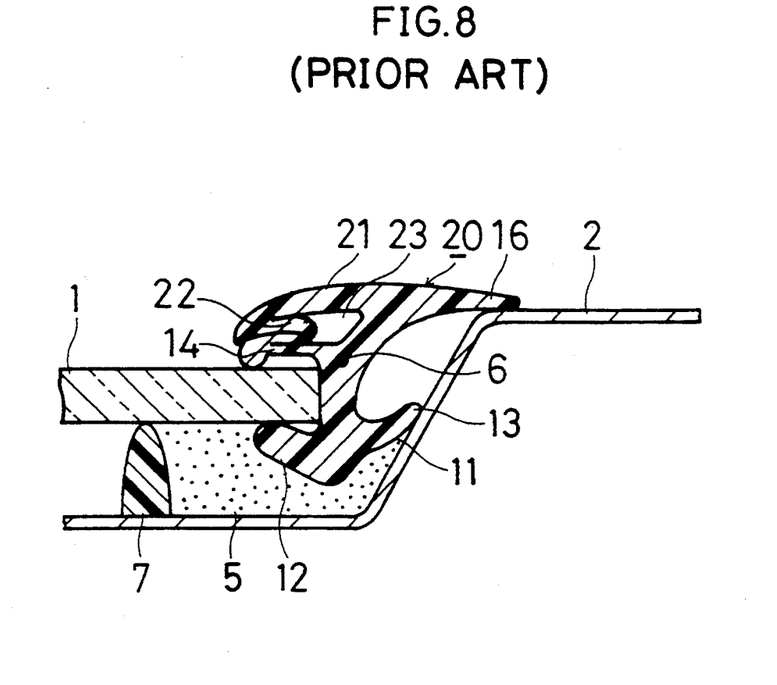
FIG. 8 is a cross-sectional view of a horizontal member of a window molding for automobiles produced by a conventional manufacturing method for forming an elongate body having a thickness change.

A window molding for automobiles that is produced by a conventional manufacturing method for forming an elongate body having a thickness change is disclosed in FIG. 6 to FIG. 8.

As shown in FIG. 6, the window molding is molded into an elongate shape that is composed of a pair of vertical members 10 and a horizontal member 20. The vertical members 10 are respectively fitted into gaps between right and left edges of a front window glass 1 and a window frame 2 of an automobile windshield. The horizontal member 20 is fixed into a gap between an upper edge of the glass 1 and the frame 2.

As shown in FIG. 7, the vertical member 10 has a leg 11 inserted into the gap between both the lateral edges of the glass 1 and the frame 2. An inner support 12 and a retaining lip 13 are protruded from the leg 11. The inner support 12 sustains a rear surface of a perimeter of the window 1. The retaining lip 13 is elastically contacted with an inner surface of the frame 2. An outer support 14 is formed on the leg 11 so as to face the inner support 12 and touch a front surface of the window 1. The leg 11 is secured by an adhesive 5 to the frame 2 which is provided on both lateral sides of the automobile body. A head 15 is integrally formed on the leg 11 at a position remote from the outer support 14, so as to face support 14. A seal lip 16 is protruded from the head 15 toward the frame 2 and is elastically contacted with an outer surface of the frame 2. A folding piece 17, substantially of an inwardly bending angle section, is integrally formed between leading ends of the outer support 14 and the head 15. A fixed, closed cavity 18 is defined by a space surrounded by an upper part of the leg 11, the head 15, the folding piece 17 and the outer support 14.

The horizontal member 20 is molded into a section shown in FIG. 8 by extruding a synthetic resin into the same shape as the vertical member 10, pressing the head 15 of the extruded vertical member 10 in its thickness direction by a press roller or the like, thereby obtaining a deformed head 21. The folding piece 17 is then bent inwardly so as to be folded into a deformed folding piece 22. A deformed cavity 23, having a smaller and different closed section as compared with cavity 18, is defined by a space surrounded by the upper part of the leg 11, the deformed head 21, the deformed folding piece 22 and the outer support 14. The remaining construction of the horizontal member 20 is same as the vertical member 10. As shown in FIGS. 7 and 8, a metal wire 6 is inserted in the molding for reinforcement, preventing its elongation. A dam 7 seals the adhesive 5 between the glass 1 and frame 2.

Next, a manufacturing method is described for forming the a conventional elongate body have a thickness change, as constructed above.

For molding the window molding, a synthetic resin such as a polyvinyl chloride is extruded by an extruder into the same shape as the vertical member 10. The head 15 of the extruded body corresponding to the horizontal head 20 is pressed by the press roller in the thickness direction, thereby bending inwardly the folding piece 17 at its corner and piling the deformed folding piece 22 and the deformed head 21 on the outer support 14. Then, the extruded body is cooled, solidified and cut to length to complete the window molding. When the window molding is fitted on the perimeter of the window glass 1, the heads 15 of the vertical members 10 project from the window 1. Thus, an outer surface of the folding piece 17 prevents rainwater swept by a wiper 3 from overflowing the frame 2 and guides and drains the rainwater downward along the lateral edges of the window 1. The horizontal head 20 protruded from the window 1 less than the vertical members 10, so as to improve aerodynamic characteristics.

In the conventional manufacturing method, since the horizontal head 20 is obtained by pressing the head 15 of the extruded vertical member 10, the outer support 14, the deformed folding piece 22 and the deformed head 21 of the horizontal member 20 have the same thicknesses respectively as the outer support 14, the folding piece 17 and the head 15 of the vertical member 10. Since the vertical member 10 has a thickness which gives it a predetermined rigidity in order to keep its shape after being fitted to the window 1, the overall thickness of the joined outer support 14, deformed folding piece 22 and head 21 is larger than necessary. As a result, the height the horizontal member 20 protrudes from the window 1 is increased, thereby, possibly affecting the aerodynamic characteristics.

SUMMARY OF THE INVENTION

In view of the above, it is an object of the invention to provide a manufacturing method for forming an elongate body having a large thickness change.

In accordance with one embodiment of the invention, there is provided a manufacturing method for forming an elongate body having a thickness change in which a first tubular portion of a predetermined thickness is extruded into an elongate shape of a fixed outline in a first extruding step. A second tubular portion having a thickness less than the thickness of the first portion is extruded, successively to the first portion, into an elongate shape of a same outline as the outline of the first portion, in a second extruding step. The second portion is pressed in a height direction and deformed into an outline having a height less than the height of an outline of the first portion, after it had been pressed.

In accordance with another embodiment of the invention, an apparatus is provided for forming an elongate body having a thickness change in which a die, having a bore, is provided in an extrusion head. A slide core, having a tapered surface tapering toward a leading end thereof, is disposed in the bore of the die. The slide core is axially reciprocated between a first position, where the leading end thereof is placed substantially at a same plane as a leading end of the bore of the die, and a second position, where the leading end thereof is protruded from the leading end of the bore of the die.

In accordance with still another embodiment of the invention, an apparatus is provided for forming an elongate body having a thickness change including an extruder having an extrusion head for extruding an elongate body of a tubular shape and thickness changing means for changing a wall thickness of the elongate body. Pressing means is provided adjacent to the extruder for pressing the elongate body extruded from the extruder.

Further objects and advantages of the invention will be apparent from the following description, with reference to the accompanying drawings, wherein preferred embodiments of the invention are clearly shown.

DETAILED DESCRIPTION OF THE PRESENTLY PREFERRED EXEMPLARY EMBODIMENTS

Referring to the drawings, wherein like reference characters designate like or corresponding parts throughout the several views, several preferred embodiments of a window molding for automobiles of the invention will be described hereafter. The same reference characters as the prior art designate the same or corresponding parts.

Figure 1:
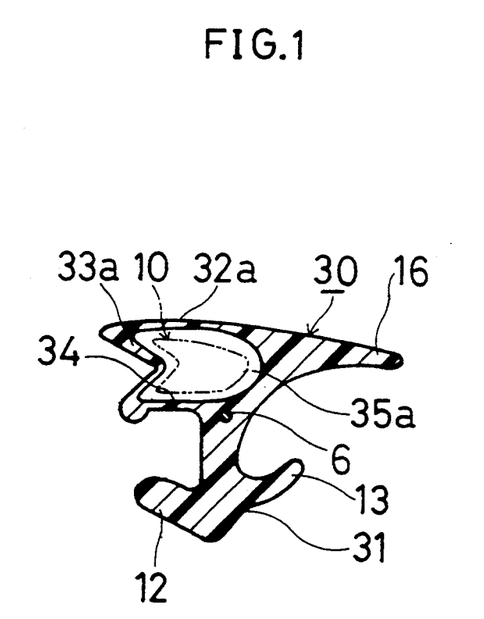
FIG. 1 is a cross-sectional view of a vertical member of a window molding for automobiles produced by one embodiment of a manufacturing method of the invention for forming an elongate body having a thickness change.
Figure 2:
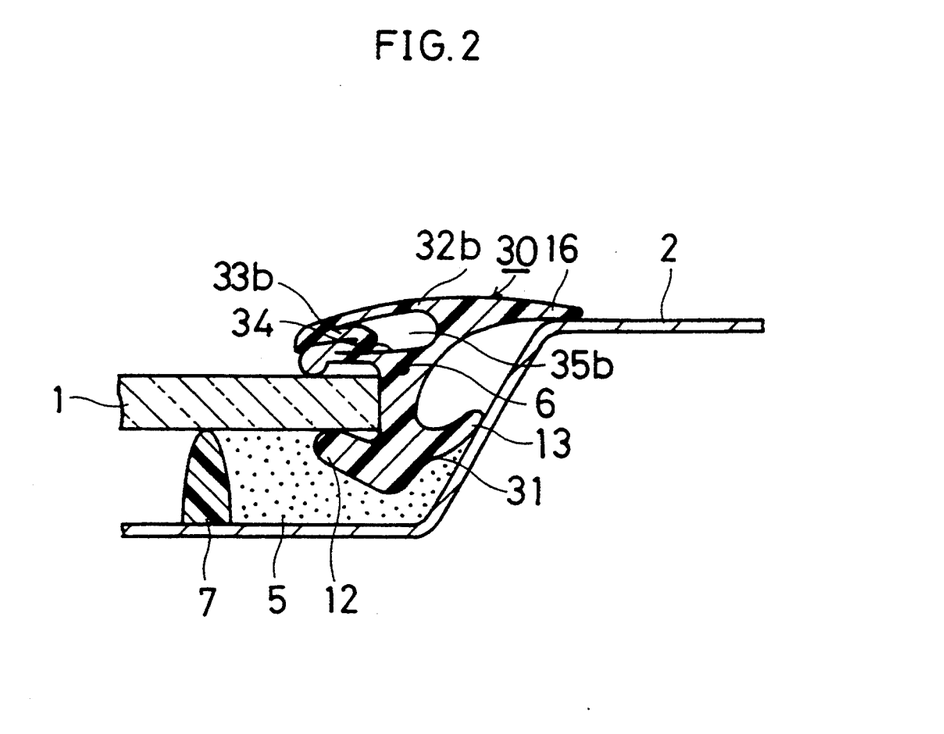
FIG. 2 is a cross-sectional view of a horizontal member of a window molding for automobiles produced by one embodiment of a manufacturing method of the invention.

In FIGS. 1 and 2, a window molding for automobiles is shown as an example of an elongate body having a thickness change. The window molding is composed of a pair of vertical members 10 and a horizontal member 30. The vertical members 10 have the same structure as the conventional member of FIG. 7. As shown by a two-dot chain line of FIG. 1, and with reference to FIG. 7, the upper part of the leg 11, the head 15, the folding piece 17 and the outer support 14 of the vertical member 10 are extruded into predetermined thicknesses respectively so as to have necessary rigidity and to keep their shapes when fitted on the window 1, as in the conventional vertical member. The horizontal member 30, fundamentally, has a similar construction to that of the conventional member 20 of the FIG. 8. However, as shown by a solid line of FIG. 1, an upper part of a leg 31, a head 32a, a folding piece 33a and an outer support 34 are extruded into thicknesses considerably less than the thickness of the vertical member 10. Thus, an enlarged cavity 35a, having larger cross-sectional area than that of cavity 18 of the vertical member 10, is defined by a space surrounded by the upper part of the leg 31, the head 32a, the folding piece 33a and the outer support 34 of the horizontal member 30. After the horizontal member 30 is pressed, as shown in FIG. 2, the folding piece 33a is inwardly bent at its corner so as to define a deformed folding piece 33b. The deformed folding piece 33b and a deformed head 32b are piled-up on the outer support 34 to define a deformed, enlarged cavity 35b.

Next, an apparatus for manufacturing the above constructed window molding is described hereafter.

Figure 3:
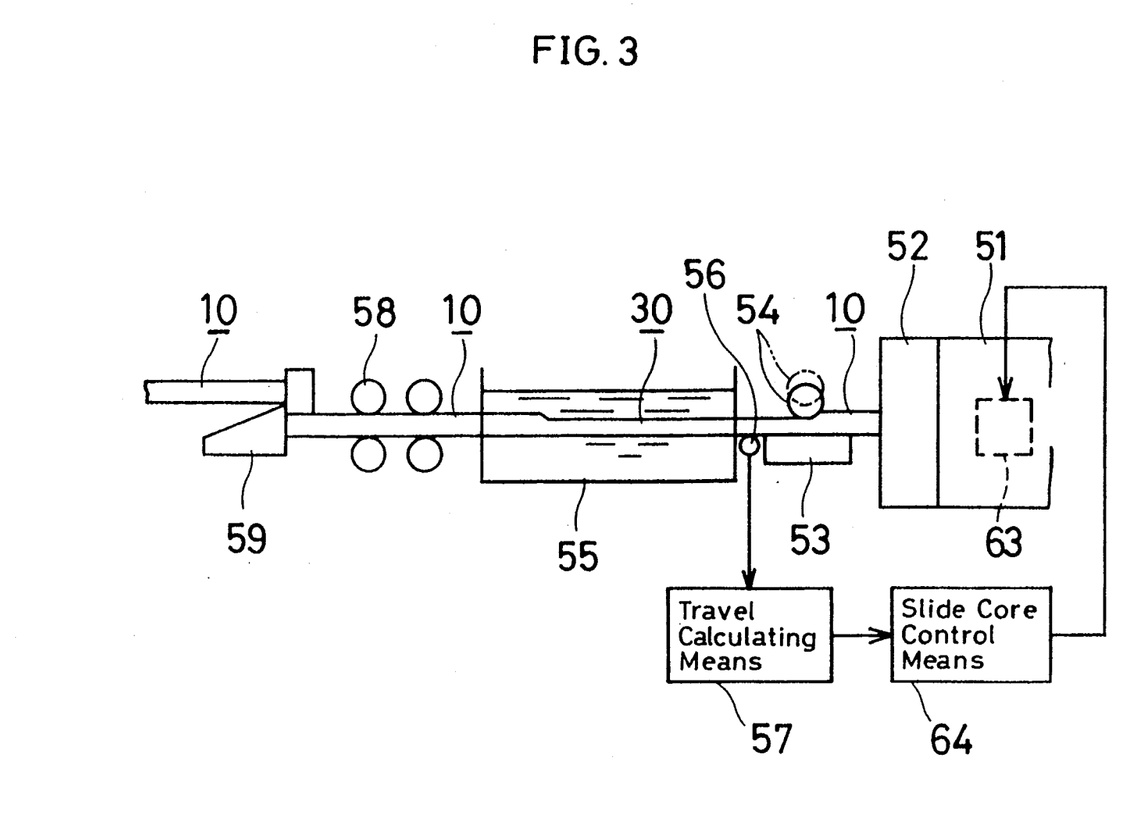
FIG. 3 is a schematic side view of the apparatus provided in accordance with the invention used in a first embodiment of a manufacturing method for forming an elongate body having a thickness change.

Referring to FIG. 3, a jig 53 and a press roller 54 are disposed near an extrusion head 52 of an extruder 51 so as to be vertically opposite to each other. A cooling water tank 55 is arranged next to the press roller 54 in an extruding direction. An encoder 56 is provided between the press roller 54 and the cooling water tank 55. The encoder 56 contacts the vertical member 10 or the horizontal member 30 extruded from the extrusion head 52 and rotates to detect a moving distance of the vertical member 10 and the horizontal member 30. The detected travel distance is inputted into a travel calculating means 57. Drawing rollers 58 and a cutter 59 are placed next to the cooling water tank 56. The drawing rollers 58 draw-out an extruded product, composed of the vertical member 10 and the horizontal member 30, synchronously, at the extruding speed of the extruder 51. The travel calculating means 57 calculates the moving distance of the vertical member 10 and the horizontal member 30 on the basis of detection signals generated by the encoder 56. The calculating means 57 controls the press roller 54 so that it moves between an upper position, shown by a dotted line, and a lower position, shown by a solid line of FIG. 3, according to calculated values. The calculating means 57 operates the cutter 59 to cut the extruded product of the members 10 and 30 to a fixed length.

Next, the structure of the extrusion head 52 is described in detail.

Figure 4:
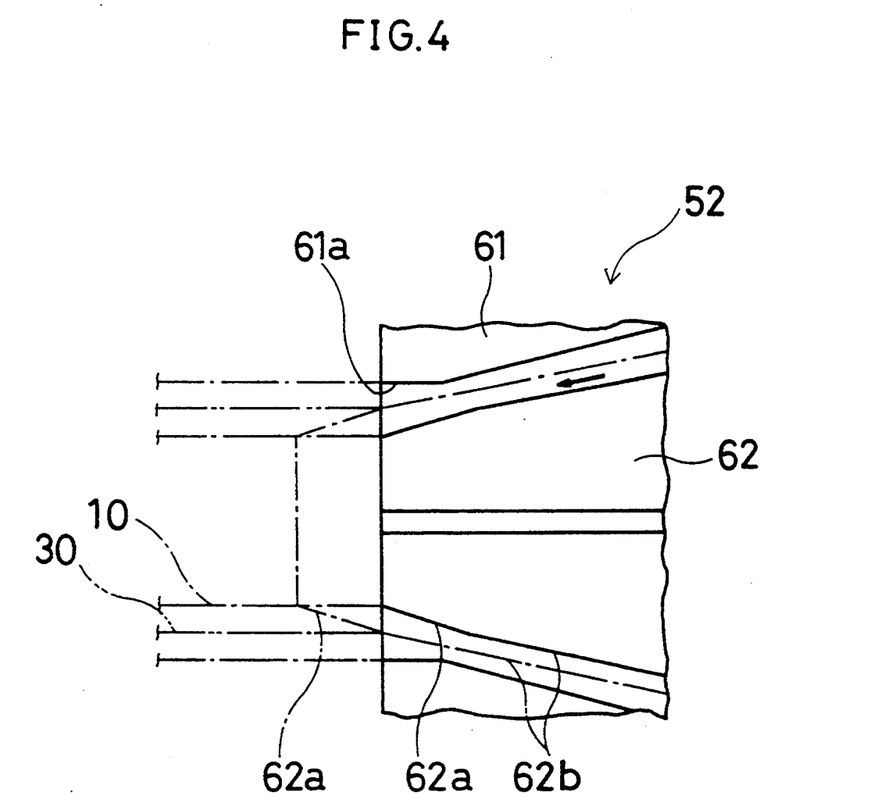
FIG. 4 is a schematic sectional view, partly enlarged, of an extrusion head of an extruder used in a first embodiment of a manufacturing method of the invention.

Referring to FIG. 4, the extrusion head 52 has a die 61. The die 61 has a fixed diameter bore 61a at its leading end. A slide core 62 has its base end attached to a supporting means (not shown) so as to reciprocate axially within the bore 61a. The slide core 62 has its leading end portion formed with a first surface 62a that tapers toward the leading end. A second tapered surface 62b is formed on a portion near the base end of the slide core 62 so as to be continuous with the first tapered surface 62a. The second surface 62b extends substantially in parallel with an inside part of a surface of the bore 61a of the die 61. Thus, a forming space of a fixed section corresponding to the extruding shape is defined between the tapered surface 62a or 62b and the leading end portion of the surface of the bore 61a of the die 61. Preferably, an angle of the second tapered surface 62b is set to be slightly more obtuse than an angle of the first tapered surface 62a. The base end of the slide core 62 is drivingly connected with drive means 63. The drive means 63 is preferably composed of a solenoid and an air cylinder. The drive means 63 is connected with a slide core control means 64. The travel calculating means 57 computes the moving distance of the extruded product 10, 30 on the basis of the detection signals from the encoder 56, as mentioned above. Then, the slide core control means 64 controls operation of the drive means 63 according to the computed values of the calculating means 57, thereby axially reciprocating the slide core 62 between an advanced position shown by a dashed line in FIG. 4 and a retracted position shown by a solid line. Namely, when the slide core 62 is placed at the retracted position, the cross-sectional area of the forming space is same as that of the vertical member 10. When the slide core 62 is placed at the advanced position, the cross-sectional area of the forming space is same as that of the horizontal member 30.

Next, a first embodiment of a manufacturing method for forming the window molding is described.

When the vertical member 10 is extruded from the extrusion head 52 of the extruder 51, the slide core control means 64 controls the drive means 63, which is provided inside the extrusion head 52, on the basis of commands from the travel calculating means 57. Thus, the slide core 62 is placed at the retracted position, as shown by the solid line in FIG. 4. Thus, the leading end of the first tapered surface 62a is positioned substantially at the same plane as the leading end of the surface of the bore 61a of the die 61, defining a forming space between the leading end of the bore 61a and the leading end of the surface 62a. An extruded body from the extrusion head 52 has a shape corresponding to that of the forming space, which is the shape of the vertical member 10, having a large wall thickness with its interior surface placed at a position shown by a dashed line in FIG. 4. When the vertical member 10 is extruded from the extrusion head 52 and passed under the press roller 54, the press roller 54 is kept retracted at the upper position by a command of the travel distance calculating means 57, so that the vertical member 10 is molded to a desired length.

When the horizontal member 30 is extruded from the extrusion head 52, the slide core control means 64 controls the drive means 63 to position the slide core 62 at the advanced position, as shown in FIG. 4 by the dashed line, on the basis of a command from the travel calculating means 57. Thus, the leading end of the first surface 62a is protruded from the leading end of the bore 61a. Thus, a forming space is defined between the leading end of the bore 61a and the leading end of the second tapered surface 62b. The extruded body from the extrusion head 52 has a shape corresponding to that of the forming space, which is the shape of the horizontal member 30, having a small wall thickness in a non-pressed state and has its interior surface placed at a position shown by a two-dot chain line in FIG. 4. When the non-pressed horizontal member 30 is extruded from the extrusion head 52 and passed under the press roller 54, the press roller 54 is kept at the lower position by a command of the travel distance calculating means 57, so that the non-pressed horizontal member 30, which is in a heated and softened state just after extrusion, has its head 32a pressed by the press roller 54. At this time, the enlarged cavity 35a of the non-pressed horizontal member 30 permits deformation of the head 32a.

Thus, the folding piece 33a of the horizontal member 30 is bent at the corner so as to define the deformed folding piece 33b which is piled-up on the outer support 34. Moreover, the deformed head 32b is disposed on the deformed folding piece 33b. Finally, the horizontal member 30 is pressed into the section shown in FIG. 2, so that the deformed enlarged cavity 35b is smaller than, and different from, that of cavity 18 of the vertical member 10.

A height of a boundary portion between the vertical member 10 and the horizontal member 30 is varied gradually from a height of the vertical member 10 to a height of the horizontal member 30 or vice versa, in order to prevent a discontinuous line. For that purpose, the press roller 54 is controlled to move up and down, thereby changing the pressing force extended on the boundary portion by commands from the travel calculating means 57. For the same purpose, it is preferable that the slide core control means 64 controls the slide core 62 to move axially from the retracted position to the advanced position or vice versa via the drive means 63 so as to gradually change the sectional area of the forming space.

After the vertical member 10 and the horizontal member 30 have passed the jig 53 and the press roller 54, they are fed to the cooling water tank 55. They are cooled and hardened in the tank 55 to be kept into their respective shapes and made into an extruded product. Subsequently, the extruded product is drawn-out by the drawing rollers 58 and transferred to the cutter 59. Then, the extruded product is cut to a fixed length or a total length of the right and left edges and upper edge of the front window glass 1 on the basis of a command from the travel calculating means 57.

The manufactured window molding is then transported to a production line of cars and fitted into a gap between the frame 2 of the car body and the front window glass 1. In this case, the legs 11, 31 of the vertical members 10 and the horizontal member 30 are successively inserted into the gap between the peripheral edges of the window 1 and the frame 2 and secured to the frame 2 by the adhesive 5. The head 15 of the vertical member 10 covers the gap between the right and left edges of the window 1 and the frame 2 while protruding from the outer surface of the window 1. The deformed head 32b of the horizontal member 30 closes the gap between the upper edge of the window 1 and the frame 2, while protruding from the outer surface of the window an amount less than that of the vertical members.

As mentioned above, the present embodiment provides a manufacturing method for a window molding, in which the vertical members 10 and the non-pressed horizontal member 30 of the same shape, are successively extruded from the extrusion head 52. The non-pressed horizontal member 30 is then pressed by the press roller 54 toward the outer support 34 so that the folding piece 33a is inwardly bent at the corner, thereby piling-up the deformed folding piece 33b and the deformed head 32b on the outer support 34. Thus, the horizontal head 30 is deformed so as to have an outline of a smaller height than an outline of the vertical member 10. In the present embodiment, the slide core 62 is controlled to move in the extrusion head 52, between the retracted position and the advanced position, by the drive means 63 so that the quantity of the synthetic resin from the extrusion head 52 is increased or decreased to extrude the upper part of the leg 11, the head 15, the folding piece 17 and the outer support 14 of the vertical member 10 into an elongate tubular shape of a fixed-wall thickness. Further, the upper part of the leg 31, the deformed head 32b, the deformed folding piece 33b and the outer support 34 of the horizontal member 30 is extruded into an elongate tubular shape having a smaller wall thickness than the vertical member 10.

Accordingly, the wall thickness of the vertical member 10 is large enough to maintain its original shape when fitted to the window glass 1 of the car. Thus, the vertical member 10 is endowed with a desired rigidity to prevent its deformation when fitted to the window glass 1. On the other hand, the wall thickness of the horizontal member 30 is set small enough to facilitate its pressing and deforming work as well as to ensure small overall height after the deformation step. Thus, when the horizontal member 30 is pressed in the height direction, the pressing and deforming work is easily accomplished. When fitted to the window 1, the horizontal member 30 only protrudes slightly from the window 1 due to its reduced thickness. As a result, when the elongate body is used for a window molding, it is possible to make the height difference sufficiently large between the vertical member 10 and the horizontal member 30. Thus, it is possible to smoothly and surely drain the rainwater flowing on the window 1 by the outer surface of the folding piece 17 of the vertical member 10. Moreover, there is no fear that the horizontal member 30 affects the aerodynamic characteristics of the car. Furthermore, it is possible to reduce the amount of material necessary for producing the window molding, thereby lowering production costs.

Next, a second embodiment of the invention will be described hereafter. The second embodiment is explained only with respect to differences from the first embodiment. The same reference characters are used for the same elements as in the first embodiment.

Figure 5:
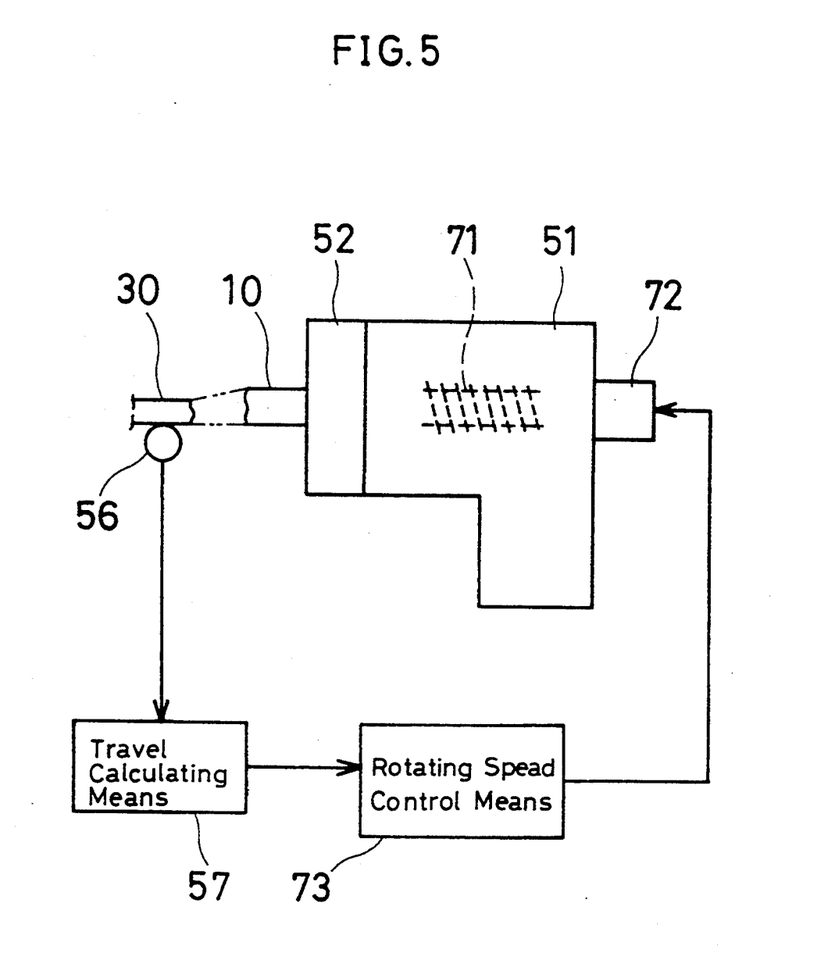
FIG. 5 is a schematic side view of an extruder used in a second embodiment of a manufacturing method of the invention.

Referring to FIG. 5, a screw 71 is disposed in an extruder 51. A vector control motor 72 is drivingly connected with a base end of the screw 71. The vector control motor 72 is also connected to a rotating speed control means 73. The above mentioned travel calculating means 57 computes a moving distance of an extruded product on the basis of detection signals from the encoder 56. The rotating speed control means 73 controls rotation of the vector control motor 72 on the basis of computed values of the travel calculating means 57. Thus, the rotating speed of the screw 71 is varied to control an amount of a synthetic resin supplied to the extrusion head 52. The rotating speed control means 73 keeps the vector control motor 72 rotating at a first rotating speed so that an extruding speed of the vertical member 10 is synchronized with a drawing speed of the drawing rollers 58, when the vertical member 10 is extruded from the extrusion head 52. The rotating speed control means 73 keeps the vector control motor 72 rotating at a second rotating speed which is lower than the first rotating speed so that an extruding speed of the non-pressed horizontal member 30 is lower than the drawing speed of the drawing rollers 58, when the horizontal member 30 is extruded from the extrusion head 52. At this time, it is preferable to detect pressure fluctuations of the synthetic resin inside the extrusion head 52 and input the fluctuations into the rotating speed control means 73, thereby optimally controlling the rotating speed of the vector control motor 72. Thus, the vertical member 10 and the non-pressed horizontal member 30 are made to a desired thicknesses, respectively.

Namely, in this embodiment, a cross-sectional area of a forming space of the extrusion head 52 is not changed, but is fixed. However, when the vector control motor 72 is rotated at the first rotating speed via the rotating speed control means 73, the shape of the extruding body of the extrusion head 52 is same as the shape of the forming space, which is the shape of the vertical member 10 having the large wall thickness, as in the normal extrusion. When the vector control motor 72 is rotated at the second rotating speed via the rotating speed control means 73, a shape of the extruding body of the extrusion head 52 is thinner than the shape of the forming space, which is the shape of the non-pressed horizontal member 30 having the small wall thickness, since the drawing speed of the drawing rollers 58 is faster than the extruding speed of the extrusion head 52. The second rotating speed of the vector control motor 72 is determined in consideration of a desired thickness of the non-pressed horizontal member 30 relative to a thickness of the vertical members 10 which are extruded from the extrusion head 52.

As mentioned above, the second embodiment discloses a manufacturing method of the window molding, in which the vector control motor 72 for driving the screw 71 is controlled to rotate at the first rotating speed or the second rotating speed. Thus, the upper part of the leg 11, the head 15, the folding piece 17 and the outer support 14 of the vertical member 10 is extruded into an elongate tubular shape of a fixed wall thickness. The upper part of the leg 31, the deformed head 32b, the deformed folding piece 33b and the outer support 34 of the horizontal member 30 is extruded into an elongate tubular shape having a smaller wall thickness than the vertical member 10 and the horizontal member 30 as in the first embodiment, only by adopting the vector control motor 72 as a driving means of the screw 71, so that a entire structure can be simplified.

While the slide core 61 of the structure shown in FIG. 4 or the vector control motor 72 of the structure shown in FIG. 5 is used in the first or second embodiment for the purpose of changing the wall thicknesses of the vertical member 10 and the non-pressed horizontal member 30, the present invention is not limited in such a structure, but may be modified in any way as long as it is possible to change the thicknesses of the vertical member 10 and the non-pressed horizontal member 30. For example, when the non-pressed horizontal member 30 is extruded, the border line between the first tapered surface 62a and the second tapered surface 62b of the slide core 62 may not be placed at the same plane as the leading end of the bore 61a of the die 61, but a predetermined intermediate position of the tapered surface 62a, 62b may be disposed at the same plane as the leading end of the bore 61a so that a forming space is defined therebetween. Or, a shape of the surface of the bore 61a of the die 61 may alternately be formed into a tapered shape corresponding to the tapered surface 61a or 61b of the slide core 62.

While the above embodiments are embodied in the manufacturing process of the car window molding, the present invention can be applied to other elongate bodies as long as they have a thickness change or a height difference depending on longitudinal positions. While, in the illustrated embodiments, the retaining lip 13 and the seal lip 16 are molded of the same material as the leg 11, 31 and the head 15, 32a, they may alternately be formed of a soft synthetic resin by simultaneous extrusion.

While, in the above embodiments, the thickness of the window molding is changed substantially uniformly at the vertical member 10 and the horizontal member 30, it is possible to change partially the angle of the tapered surface 62a of the slide core 62 so as to vary more largely the thickness of part of the molding, e.g. the head 15, 32a or the folding piece 17, 33a or the like. It is also possible to change the angle of the tapered surface 62a of the slide core 62 so that the folding piece 33a of the horizontal member 30 is removed and that a recess is formed between the head 32a and the outer support 34, in making the horizontal member 30 thinner than the vertical member 10. In this case, the wall thickness of the horizontal member 30 can be much smaller when it is pressed.

The preferred embodiments described herein are therefore illustrative and not restrictive, the scope of the invention being indicated in the appended claims and all variations which come within the meaning of the claims are intended to be embraced therein.

What is claimed is:

1. A method for forming an elongate window molding having a longitudinal axis and variations in wall thickness along the length thereof, the method comprising the steps of:

extruding a first elongate member having a tubular portion of a predetermined thickness, said first elongate member having a first outline in a first extruding step, said first outline consisting of a retaining leg having an inner support extending outwardly therefrom on one side and an inner retaining lip extending outwardly therefrom on an opposite side, an outer seal lip, a head portion, an outer support and a folding piece, said outer support, said folding piece, said head portion and said outer seal lip collectively extending from an upper part of said retaining leg and defining said tubular portion and an enclosed hollow tubular cavity therebetween;

extruding, successively to the first portion, a second elongate member having a tubular portion in a second extruding step, said second elongate member having a second outline substantially similar to said first elongate member, said second elongate member having said head portion, said outer support and said folding piece formed with a wall thickness less than a comparable thickness thereof in said first elongate member thereby enlarging the enclosed hollow tubular cavity by disproportionately varying wall thicknesses of the structure bounding said cavity; and pressing the folding piece of said second elongate member in a direction transverse to the longitudinal axis and into engagement with the outer seal lip to deform the second elongate member so as to have a cross-sectional height less than a cross-sectional height of the first elongate member.

2. The method according to claim 1, wherein the thickness and the outline of the first elongate member and the second elongate member are determined by a shape of the hollow tubular cavity defined in an extrusion head of an extruder, and the first extruding step and the second extruding step are carried out by changing the shape of the enclosed hollow tubular cavity from a first shape corresponding to a shape of the first elongate member and second shape corresponding to a shape of the second elongate member.

3. The method according to claim 2, wherein the step of defining the enclosed hollow tubular cavity includes providing the enclosed hollow tubular cavity between a bore of a die that is fixed in the extrusion head and a slide core that is provided in the bore, the slide core having a tapered surface and being capable of axially reciprocating between a first position where a leading end of the tapered surface is placed substantially at a plane defined at a leading end of the bore, and a second position where the leading end of the tapered surface is protruded from the leading end of the bore.

4. The method according to claim 1, further comprising drawing-out the extruded first portion and second portion at a predetermined drawing speed, the first portion being extruded at a speed equal to the drawing speed and the second portion being extruded at a speed less than the drawing speed.

5. The method according to claim 4, wherein a rotating speed of a screw provided in an extruder is varied to vary an amount of extrusion material per unit time so as to change the extruding speed of the first elongate member and the second elongate member.

6. A method as in claim 1 wherein the outer seal lip is located vertically spaced above the inner retaining lip and the outer support is located vertically spaced above the inner support.

7. A method as in claim 1 wherein the step of extruding a second elongate member includes the step of decreasing the thickness of said head portion to a greater extent than the decrease in thickness of the outer support and the folding piece.

* * * * *